United States Patent [19]
Czajkowski et al.

[11] Patent Number: 5,226,559
[45] Date of Patent: Jul. 13, 1993

[54] VEHICLE TRACK

[76] Inventors: Julian Czajkowski, R.R. No. 7, River Road, Chatham, Ontario, Canada, N7M 5J7; Eric Watson, 8 Collegiate Drive, Chatham, Ontario, Canada, N7L 4R1

[21] Appl. No.: 736,602

[22] Filed: Jul. 26, 1991

[51] Int. Cl.$^5$ .............................. F16N 31/00
[52] U.S. Cl. ........................ 220/573; 184/106
[58] Field of Search ............ 220/573, 572, 571; 184/106

[56] References Cited

U.S. PATENT DOCUMENTS

| | | | |
|---|---|---|---|
| 935,278 | 9/1909 | Smyth | 220/573 X |
| 1,330,303 | 2/1920 | Cleveland | 220/573 X |
| 2,497,565 | 2/1950 | Stark | 184/106 |
| 2,996,150 | 8/1961 | Cassem | 184/106 |
| 3,044,574 | 7/1962 | Minutillo | 184/106 |
| 3,834,527 | 9/1974 | Howe | 184/106 X |
| 3,997,073 | 12/1976 | Morris | 220/573 |
| 4,246,982 | 1/1981 | Pretnick | 184/106 |
| 4,484,661 | 11/1984 | Evenson | 220/573 X |
| 4,941,551 | 7/1990 | Visser | 184/106 |

Primary Examiner—Steven M. Pollard

[57] ABSTRACT

With regards to a vehicle storage area it is common for dropping debris, from the stored vehicle, to contaminate and/or deteriorate the vehicle storage area floor surface. In this invention, a vehicle track, when suitably placed in a vehicle storage area, provides a means of collecting and removing dropping debris from a stored vehicle thereby reducing contamination and/or deterioration of the vehicle storage area floor surface. In addition, said vehicle track aids in the reproducible placement of the stored vehicle in the vehicle storage area.

21 Claims, 3 Drawing Sheets

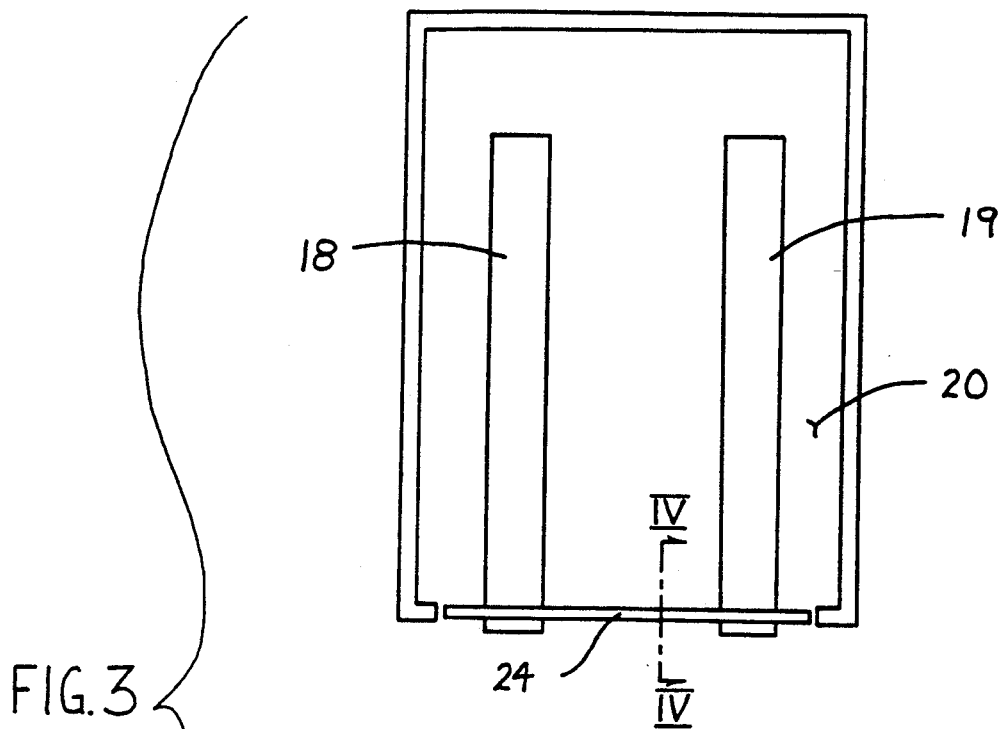
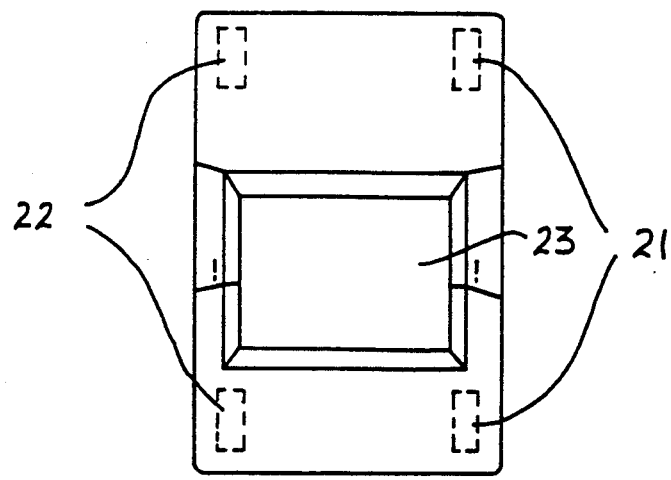
FIG. 3
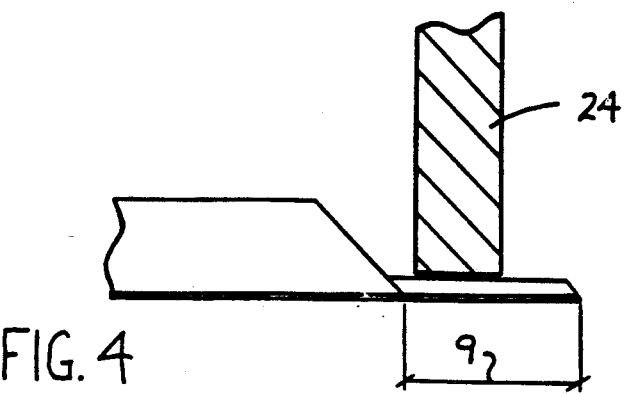
FIG. 4

VEHICLE TRACK

This invention relates to a vehicle track and more particularly a vehicle track which is utilized for stored vehicles in vehicle storage areas.

It is common to store a vehicle in a vehicle storage area and allow all dropping debris to fall on the floor of the storage area surface, i.e., a car parked in a garage where water, dirt, stones, salt, snow, ice, etc., fall on the garage floor. The accumulated debris on the garage floor contaminates and/or deteriorates and/or adheres to the floor surface making it difficult and timely to clean and is esthetically unpleasing.

It is also common practice to ineffectively utilize the floor space in the vehicle storage area due to the inability of a vehicle operator to reproducibly position the vehicle in the vehicle storage area.

We have found that these disadvantages may be significantly reduced by providing a vehicle track, which when suitably placed in a vehicle storage area, allows the dropping debris from the stored vehicle to be collected by the said vehicle track. Such a vehicle track fitted with weirs forming a channel providing a means whereby the collected debris is not allowed to contaminate and/or deteriorate the vehicle storage area surface. The vehicle track's geometry and material of construction allows for easy removal of collected debris.

The described vehicle track which provides containment of the collected debris creates a more esthetic vehicle storage area.

We have also found that the described vehicle track provides the vehicle operator with a visual and enhanced mechanical guidance to reproducibly position the vehicle in the vehicle storage area. Thereby, providing more effective use of the vehicle storage area.

In the drawings which illustrate embodiments of the invention,

FIG. 3 illustrates a plane view of the embodiment relative to a vehicle and a vehicle storage area, and FIG. 4 is section of the line IV—IV of FIG. 3.

Figure 1:
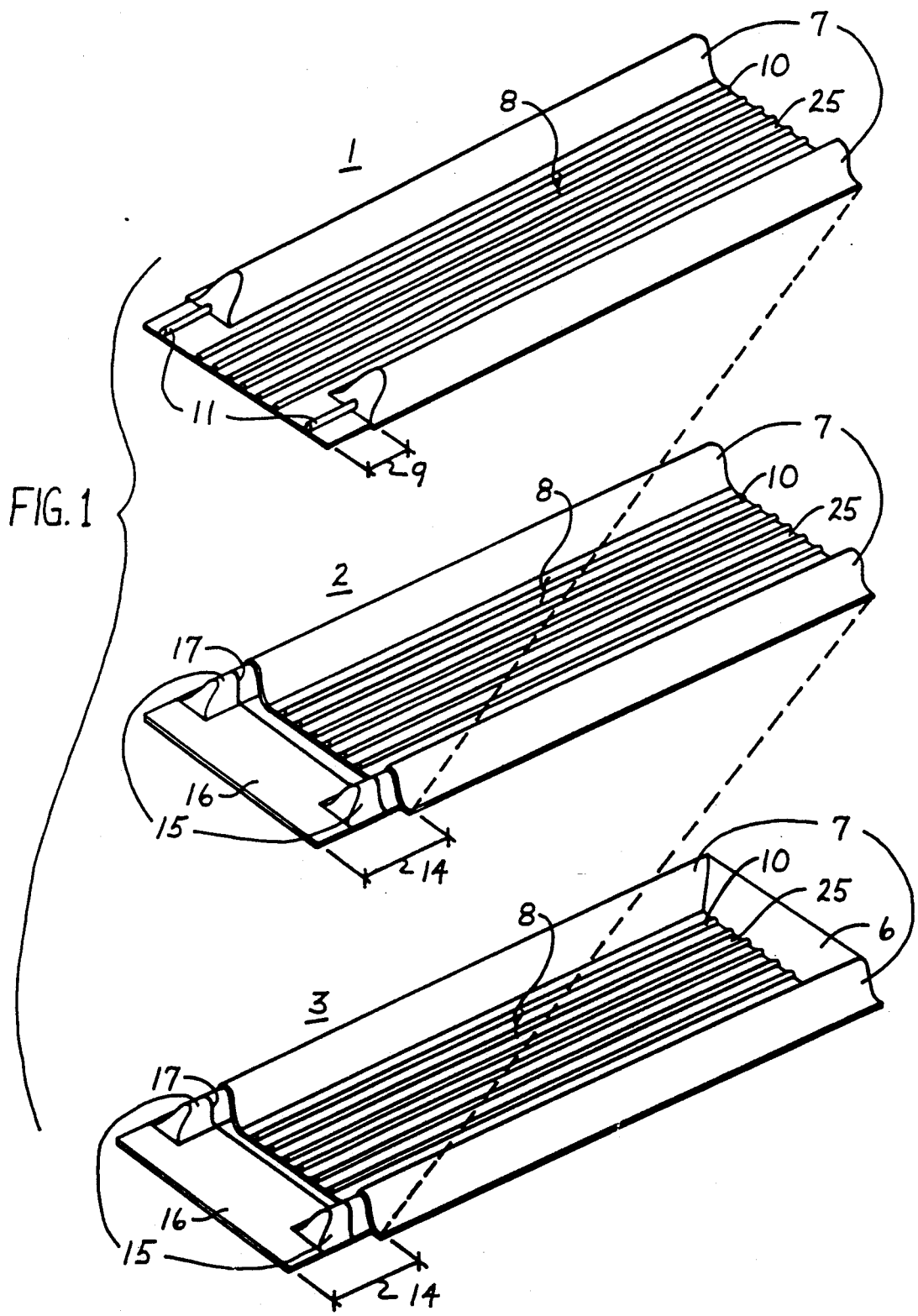
FIG. 1 illustrates a projected view of the multiple sections which comprise the embodiment.

Extruded sheets of olefinic thermoplastic elastomer, which are vacuum thermoformed to the geometries as illustrated in FIG. 1, is believed to be the best method of producing a vehicle track. It should be appreciated that said debris have poor adhesion to olefenic materials. In addition, it should be appreciated that thermoplastic elastomers are more tolerant to mechanical abuse than many other materials. The vehicle track may be of various widths, lengths, and number of sections to accomodate any stored vehicle, but in the form shown, is compatible to a passenger vehicle as illustrated in FIG. 1. It should be appreciated that a vehicle track constructed from multiple sections aids in the execution of the identified vacuum forming process as well as product packaging and handling.

Figure 2:
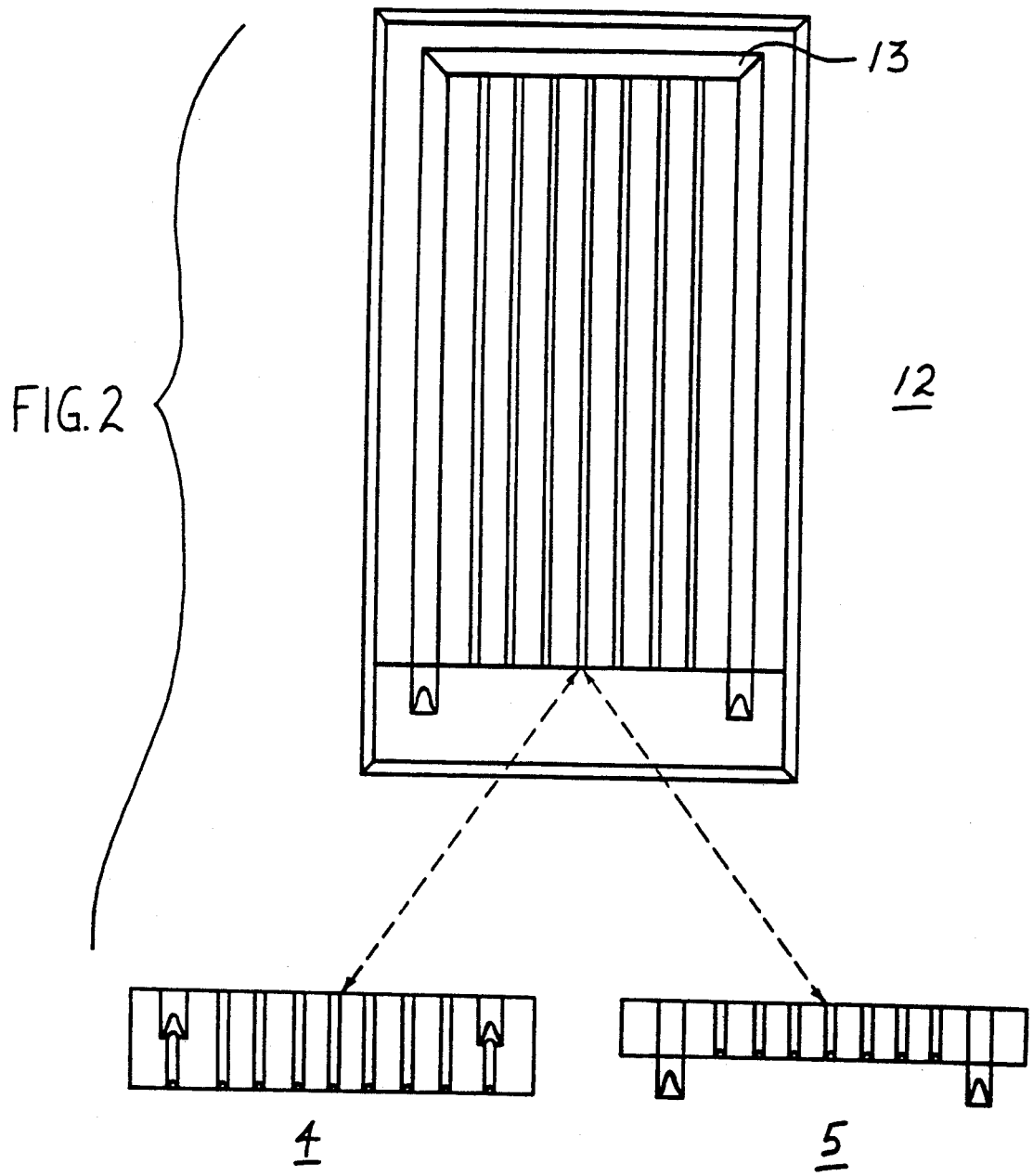
FIG. 2 illustrates a plane view of the embodiment in its' forming tool and the inserts used to form each of the multiple sections.

A single vacuum forming tool 12 having inserts 4 and 5, as illustrated in FIG. 2, is employed to form three unique sections 1, 2, and 3 as shown in FIG. 1. Discharge section 1, FIG. 1, is formed by utilizing vacuum forming tool 12 fitted with insert 4 as illustrated in FIG. 2 and furthermore created by cutting off transverse weir 6 which would have been formed by transverse weir profile 13 of vacuum forming tool 12. Middle section 2, FIG. 1, is formed by utilizing vacuum forming tool 12 fitted with insert 5 as in FIG. 2 and furthermore created by cutting off transverse weir 6 which would have been formed by transverse weir profile 13 of vacuum forming tool 12. Close-end section 3, FIG. 1, is formed and created by utilizing vacuum forming tool 12 fitted with insert 5 as illustrated in FIG. 2. It should be appreciated that the single vacuum forming tool 12 having inserts 4 and 5 which are utilized to produce the unique sections 1, 2, and 3 results in a minimum of material wastage.

With reference to FIG. 1, discharge section 1, having longitudinal weirs 7 on either side of a channel 8 and two open ends. It can be further seen, that discharge section 1 has an extending portion 9 of channel 8 beyond weirs 7. Furthermore, longitudinal ribs 10 extend the entire length of the channel 8 in discharge section 1. In addition, discharge section 1 has short longitudinal ribs 11 that extend from the termination of longitudinal weirs 7 to the end of extending portion 9. The transverse cross-sectional profile of discharge section 1 is continuous excluding extending portion 9.

With reference to FIG. 1, middle section 2, having longitudinal weirs 7 on either side of a channel 8 and two open ends. It can be further seen, that middle section 2 has an extending portion 14 of channel 8 beyond weirs 7. Furthermore, longitudinal ribs 10 extend the entire length of the channel 8 excluding extension portion 14 in middle section 2. In addition, extending portion 14 comprises of weir extensions 15 which initiate at the termination of weirs 7 to the end of extending portion 14. The weir extensions 15 have a reduced profile, equal to one sheet thickness, as compared to weir 7. Extending portion 14 furthermore comprises of a flat portion 16 between and on either side of the weir extensions 15 having a lowered elevation, by one sheet thickness, relative to the surface between longitudinal weirs 7 of channel 8 as illustrated on middle section 2, FIG. 1. The transverse cross-sectional profile of middle section 2 is continuous excluding extending portion 14.

With reference to FIG. 1, closed-end section 3 is identical in geometry as compared to middle section 2 except for the addition of transverse weir 6. It should be appreciated that the previously described geometries allows any section to be stackable upon one another. It should also be appreciated that the weir extensions 15 and extending portions 14 provide the visual perception that the assembled sections 1, 2, and 3 have exposed connections which are visually continuous. Furthermore, the previously described weir extensions 15 provide enhanced mechanical support of the overlapped portions of weirs 7, when assembled. In addition, the longitudinal ribs 10 as previously described aid in disguising minor visual imperfections normally found on otherwise economically produced flat surfaces.

As illustrated in FIG. 1, the assembly of multiple sections 1, 2, and 3 produces a vehicle track. As illustrated in FIG. 1, the extending portion 14 of middle section 2 is overlapped on assembly by the end opposite to the extending portion 9 of discharge section 1. Similarly, the extending portion 14 of closed-end section 3 is overlapped on assembly by the end opposite to extending portion 14 of middle section 2. By the application of an extruded butyl tape 17 to the extending portions 14 on middle section 2 and closed-end section 3, as shown in FIG. 1, when assembled, provides an adhesive bond to mechanically enhance the desired orientation of one section relative to another. In addition, the extruded butyl tape 17 provides a means of sealing thereby preventing undesirable leakage of collected debris between said assembled sections. It should be appreciated that to further mechanically enhance the desired orientation of one section relative to another, snap-fit fasteners, not shown, can be utilized.

With reference to FIG. 1, it should be appreciated that depending on the application and the length of the sections, discharge section 1 can be assembled to closed-end section 3 to produce a vehicle track. Furthermore, when additional length of the vehicle track is required, middle section 2 can be employed singularly or plurally assembled to one another between discharge section 1 and closed-end section 3. In addition, depending on the application and the width of the sections, vehicle tracks can be singularly or plurally utilized, but in the form shown in FIG. 3, two vehicle tracks are employed for a passenger vehicle.

As illustrated in FIG. 3, a pair of vehicle tracks 18 and 19 are utilized to accomodate a passenger vehicle 23 when stored in a vehicle storage area 20. Furthermore, said vehicle tracks 18 and 19 are so positioned such that alignment of tracking wheels 21 and 22 respectively are between the weirs 7, FIG. 1, of each said vehicle track. In addition, alignment of said vehicle tracks are so positioned to allow normal entry of a vehicle 23 into the vehicle storage area 20. Note that the lengths of vehicle tracks 18 and 19 allow total entry of vehicle 23 into vehicle storage area 20 with no obstruction when door closure 24 is utilized. As illustrated in FIG. 4, extending portion 9 of discharge section 1 is positioned underneath the bottom of door closure 24 and protrudes to the exterior of the vehicle storage area 20.

It should be appreciated, that the previously described geometry and positioning of extending portion 9 relative to door closure 24 allows for self removal of liquids debris accumulated on said vehicle track. It should also be appreciated that the previously described placement and assembly of a vehicle track can be accomplished by a single abled person without the aid of tools or modifications to the vehicle storage area.

The previously described positioning of the vehicle track relative to a vehicle allows for the collection of significant quantities of dropping debris from areas of the vehicle which are vertically above the vehicle track surface area. The vehicle track as previously described comprising of longitudinal gutters 25 located in between longitudinal ribs 10, provide recessed areas for collected debris in said vehicle track.

The vehicle tracks 18 and 19 and their positioning, as previously described and illustrated in FIG. 3, provides the vehicle operator with a visual reference thereby aiding reproducible placement of the vehicle 23 in the vehicle storate area 20. Furthermore, the vehicle tracks 18 and 19 and their positioning, as previously described and illustrated in FIG. 3, comprising of weirs 6 and 7, FIG. 1, provide a mechanical resistance to wheels 21 and 22 when they contact the said weirs 6 and 7, thereby aiding reproducible placement of the vehicle 23 in the vehicle storage area 20.

The previously described vehicle track comprising of longitudinal ribs 10 provide enhanced vehicle traction by increasing contact pressures between vehicle wheels and the said surface of the vehicle track.

The embodiments of the invention in which an exclusive property or privilege is claimed are defined as follows:

1. A device for catching debris falling from a vehicle, comprising:
 a first and a second track, each track physically separate from the other and positioned parallel to each other at a determinable spacing, each track comprising at least a first interlocking section and a second interlocking section, wherein
 the first interlocking section includes a track surface, a raised, first closed end, raised parallel first and second sides extending from the first closed end and a first open end opposite the first closed end, and wherein the second interlocking section comprises a track portion, raised parallel third and fourth sides, a second open end, wherein the first and second side, proximate the first open end, and third and fourth sides proximate, the second end, interlock with each other with the track portions of each section laying generally parallel to each other.

2. The device a defined in claim 1 wherein the second interlocking section includes a third open end, opposite the second open, to allow removal of the debris from the track surface.

3. The device as defined in claim 2 wherein the third open end includes a generally planar member to permit easy entry of the vehicle thereon.

4. The device as defined in claim 3 wherein the planar member extends outside of a vehicle storage area allowing debris to be moved from within the vehicle storage area, along the track surface, to outside of the vehicle storage area.

5. The device as defined in claim 4 wherein the planar member includes upraised portions adapted to engage a vertically movable door of the vehicle storage area such that when the door is closed it comes to rest upon the upraised portions with a spacing between a bottom surface of the door and the track surface so that debris can be removed from the track surface even when the door is shut and resting upon the upraised portions.

6. The device as defined in claim 2 including a third interlocking section, having open ends and side portions, and adapted to interlock with open ends of the first and second interlocking sections thereby extending the length of the device.

7. The device as defined in claim 2 wherein the track surface includes a plurality of grooves into which debris may accumulate.

8. The device as defined in claim 2 wherein the first open end includes an extending structure of reduced profile relative to the rest of the first and second sides and wherein the open end of another interlocking section overlays the extending structure.

9. A device for catching debris falling from a vehicle, comprising:
 a first track, comprising at least a first interlocking section and a second interlocking section, wherein
 the first interlocking section includes a track surface, a raised, first closed end, raised parallel first and second sides extending from the first closed end and a first open end opposite the first closed end, and wherein the second interlocking section comprises a track portion, raised parallel third and fourth sides, a second open end, wherein the first and second side sections proximate the first open end and third and fourth sides proximate the second end interlock with each other with the track portions of each section laying generally parallel to each other.

10. The device a defined in claim 7 wherein the second interlocking section includes a third open end, opposite the second open, to allow removal of the debris from the track surface.

11. The device as defined in claim 10 wherein the third open end includes a generally planar member to permit easy entry of the vehicle thereon.

12. The device as defined in claim 11 wherein the planar member extends outside of a vehicle storage area allowing debris to be moved from within the vehicle storage area, along the track surface to outside of the vehicle storage area.

13. The device as defined in claim 12 wherein the planar member includes upraised portions adapted to engage a vertically movable door of the vehicle storage area such that when the door is closed it comes to rest upon the upraised portions with a spacing between a bottom surface of the door and the track surface so that debris can be removed from the track surface even when the door is shut and resting upon the upraised portions.

14. The device as defined in claim 10 including a third interlocking section, having open ends and side portions, and adapted to interlock with open ends of the first and second interlocking sections thereby extending the length of the device.

15. The device as defined in claim 10 wherein the first open end includes an extending structure of reduced profile relative to the rest of the first and second sides and wherein the second open end of another interlocking section overlays the extending structure.

16. A device for catching debris falling from a vehicle, comprising:

a first and a second track, each track physically separate from the other and positioned parallel to each other at a determinable spacing, generally equal to the wheel base of the vehicle for aiding the reproducible placement of the vehicle in a vehicle storage area, each track comprising at least a first interlocking section and a second interlocking section, wherein the second section is overlaid upon the first section at a determinable position on the first section, and wherein the first interlocking section includes a track surface, a raised, first closed end, raised parallel first and second sides extending from the first closed end and a first open end opposite the first closed end, and wherein the second interlocking section comprises a track portion, raised parallel third and fourth sides, a second open end.

17. The device as defined in claim 16 wherein the first closed end and the first and second sides provides a means for providing mechanical resistance to steering of the wheels or skis.

18. The device as defined in claim 16 wherein the track includes longitudinally extending ribs wherein the ribs and the first and second sides cooperate to define means for establishing for a vehicle operator a visual reference thereby providing guidance to reproducibly place the vehicle in a vehicle storage area.

19. The device as defined in claim 16 wherein the first and second track are connected to one another with an interfacing stepped geometry thereby providing a perception that the first and second track are visually continuous.

20. The device as defined in claim 19 wherein the second section overlays the first section and wherein the ends of the side of the first section includes a closed weir providing enhanced mechanical support for the overlaid second section.

21. The device as defined in claim 16 wherein the first and second sections are manufactured of an olefinic thermoplastic for reducing adhesion of debris to the track.

* * * * *